April 9, 1935. S. W. CHAFFEE Re. 19,518
TILED FLOOR
Original Filed Oct. 22, 1930 2 Sheets-Sheet 1
Fig. 1.
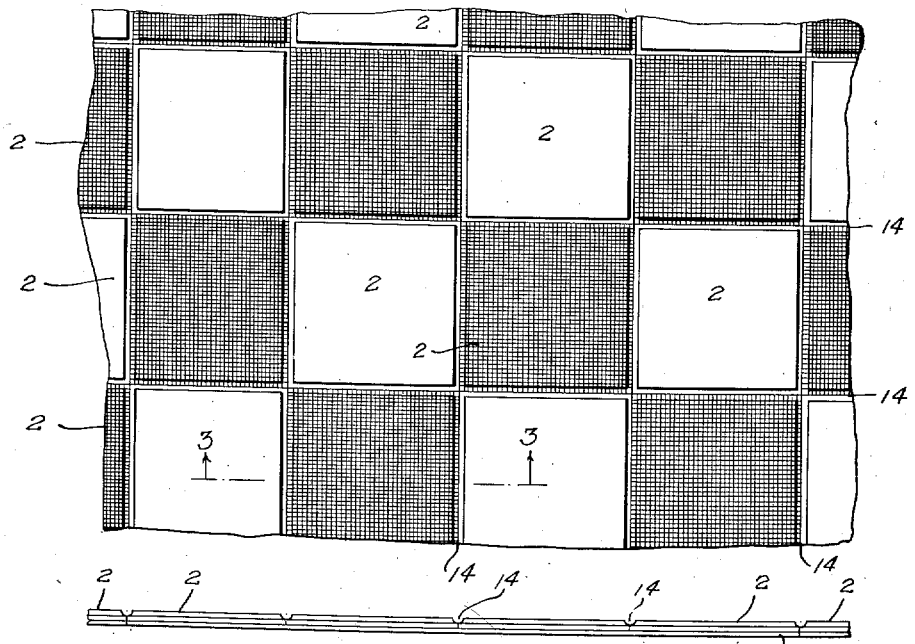
Fig. 2.
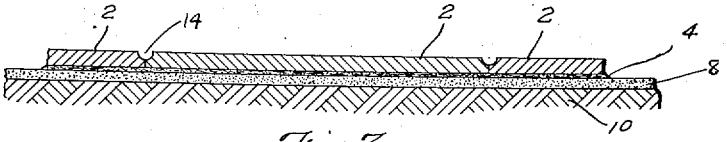
Fig. 3.
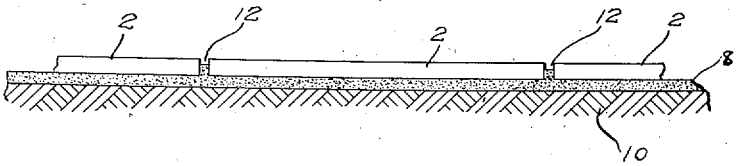
Fig. 4.
INVENTOR
STEWART W. CHAFFEE
BY Newell & Spencer
ATTORNEYS April 9, 1935. S. W. CHAFFEE Re. 19,518

TILED FLOOR

Original Filed Oct. 22, 1930 2 Sheets-Sheet 2

INVENTOR
STEWART W. CHAFFEE
BY Newell and Spencer
ATTORNEYS

Reissued Apr. 9, 1935

Re. 19,518

UNITED STATES PATENT OFFICE 19,518

TILED FLOOR

Stewart W. Chaffee, New York, N. Y.

Original No. 1,852,696, dated April 5, 1932, Serial No. 490,355, October 22, 1930. Application for reissue April 17, 1933, Serial No. 666,527

15 Claims. (Cl. 94—11)

This invention relates to improvements in the floor and wall constructions of buildings, vehicles, elevators, etc., and a general object of the invention is to provide an improved tiled floor or wall construction and an improved tile for use in such construction.

Tiled walls and floors have heretofore been made of ceramic tiles but the use of ceramic tiles has been comparatively limited because of the cost of the tiles themselves and because of the expense of the construction required to support them and of the labor required to set them in place.

When ordinary ceramic tiles are used for flooring, it has heretofore been considered necessary specially to prepare a foundation on which the ceramic tiles can properly be laid. Moreover, when a ceramic tile floor is to be laid in the place of some other type of floor in a building already constructed, it has heretofore been considered necessary substantially completely to remove the old flooring and to prepare the supporting structure in such manner that it will carry and hold a layer of cement or concrete. On this layer of cement or concrete, which must be allowed to set before further proceeding with the construction of the tile floor, the ceramic tiles have then been laid in with mortar, which must be of such composition as to secure the tiles tightly and rigidly in place and bond them to the base.

Such a floor construction is heavy and thus cannot be substituted for other floors in all types of building construction. Moreover, it is so expensive that ceramic tile floors have not gone into extensive use. A ceramic tile wall has also involved substantially the same procedure to install and such walls have therefore been used to any extent only in the better classes of buildings. Furthermore, ceramic tiles are comparatively fragile and their use has thus been limited to places where they are not subjected to shocks and to heavy wear and tear.

A particular object of the present invention is to provide an improved tiled construction for floors and walls which will simplify and facilitate their installation, contribute to their durability and add to their utility. Another object of the invention is an improved tile for use in such constructions which will have a wider field of utility than the ordinary ceramic tiles and yet will be substantially equally useful for the purposes for which ceramic tiles are used. To this end the invention aims to produce a tile which, by reason of its construction and its resistance to wear and to breaking strains, by reason of the comparatively light units in which it can be practicably produced, and by reason of the comparatively simple method of its permanent installation, can be manufactured, sold and installed to produce floors and walls having substantially all of the structural advantages of the ceramic tile floors and walls for substantially all of the uses to which ceramic tiles are put, while overcoming many of the objectionable features of such constructions for many uses and at the same time presenting many advantageous features of construction which extend widely the utility of tiled constructions in buildings, vehicles, elevators, etc.

An important feature of the present invention is the provision of a tile for floor and wall constructions which, while it presents a hard wear-resisting surface substantially impenetrable to the impacts to which floors and walls are ordinarily subjected, and even to the more severe impacts to which they are occasionally accidentally subjected, and while it is substantially rigid, nevertheless has sufficient resiliency and flexibility to compensate for considerable unevennesses in pressure thereon without breaking, thus permitting the use therewith of resilient, cushioning and sound-absorbing supporting means and further permitting its more ready and more economical installation, by reason of the fact that it is not necessary to take such pains to protect the tile against rough usage and slight displacements.

A further important feature of the invention is a tiled floor or wall construction, whether employing the particular tile which is one of the features of the present invention or other forms of tile, in which there is interposed between the tiles and the supporting base or wall structure resilient means for cushioning the tiles against shock. This, in the case of floor constructions, also makes a floor that is not so hard to walk upon as the ordinary tile floor. A particular feature of the invention is the utilization of this cushioning means as the means or a part of the means for permanently securing the tiles in position in the floor or wall construction.

Still another important feature of the invention is the employment for securing the tiles permanently in position in the floor or wall construction of means which both waterproofs the floor or wall and serves as a cushioning support for the tiles.

A novel feature of the invention, that is employed particularly when tiles of relatively small dimensions are used, is the arrangement of these tiles in design units on unit bases, preferably of material of somewhat greater flexibility than the tiles and of considerable resiliency, and preferably material that is waterproofed so that it contributes both to the waterproofing of the wall or floor construction and at the same time forms a cushioning support for the tiles, the arrangement of these tile sections on unit bases in this manner facilitating the laying of the floor or the placing of the tiles in position on the wall and at the same time permitting the use of additional means, particularly in the wall constructions, for securing the tiles permanently in position.

In addition to improving the construction of tiled floors and walls so that they can be installed more economically and so that they will have a wider field of utility, the invention aims to provide a tile for use in such constructions that is hard surfaced, durable and not fragile and that can be manufactured comparatively cheaply and yet in a great variety of artistic designs and colors. To this end an important feature of the invention is a tile construction which can be produced on a paper-making machine of such comparatively common and comparatively inexpensive materials as water-setting cements and reenforcing means therefor, such as fibres or metals.

Other objects and important features of the invention will appear from the following description and claims when considered in connection with the accompanying drawings, in which Fig. 1 is a plan view of a portion of a unit of a tile floor or wall covering embodying the present invention;

Fig. 2 is an edge view of one of these units;

Fig. 3 is a sectional view on the line 3—3 of Fig. 1, showing one of the preferred tiled floor or wall constructions embodying the present invention;

Fig. 4 is a modified form of floor or wall construction in which the tiles are laid directly upon the cushioning layer of mastic adhesive which in turn bonds them to the supporting structure.

Figure 7:
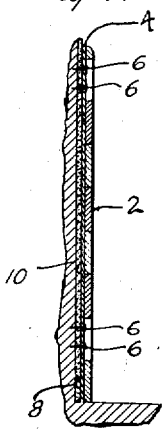
Figure 6:
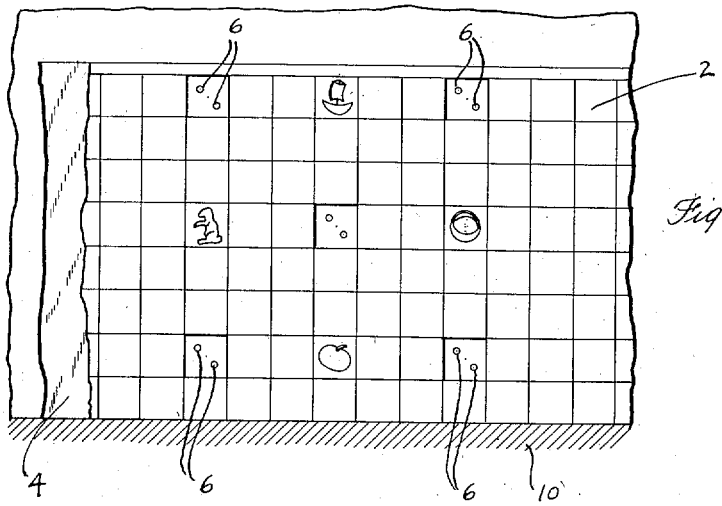

Fig. 6 is still another modification of the invention in which design units, each comprising a plurality of tiles, have an occasional tile omitted to permit the insertion of special design elements to give a Dutch tile or similar effect, this omission of a tile also permitting the use of additional securing means, such as nails, for securing the units in position, particularly when used for wall constructions;

Fig. 7 is a vertical section on the line 7—7 of Fig. 6; and

Figure 8:
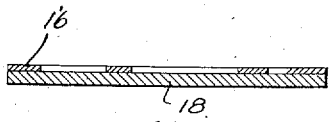

Fig. 8 illustrates a modification of the tile construction in which a layer of one color is formed or cemented over a layer of the same material but different color, whereby when a design is cut out of the top layer the color of the base will shown through.

Although many of the novel features of the invention are substantially equally useful with tiles of ordinary construction and composition, the invention as a whole can be carried out most advantageously and economically when a tile is employed which is constructed along the lines of that disclosed in my copending application Serial No. 455,974, filed May 26, 1930, for Letters Patent for improvements in tiles, of which application this application is in part a continuation.

A tile useful in producing the novel and improved tiled floor or wall constructions of the present invention may be manufactured by charging a mixture of the desired proportions of asbestos fibre or other suitable reenforcing means and Portland cement into a beater with a suitable amount of water and, when the material has been thoroughly beaten and mixed into a pulpy mass, running it into a web-forming machine similar to the ordinary paper-making machine, which is provided with various cylinders on which webs of the pulpy mass are collected and then passed on to a belt where a member of the webs are superimposed one upon the other, the belt passing a series of these cylinders in succession.

Before charging the stock into the beater, it may be mixed with pigments in order to effect the coloring of the resultant product, or the fibres or other reenforcing means may be separately dyed before mixing with the Portland cement, and in various other ways desired color and design effects may be obtained in the product as it comes from the web-forming machine.

From the belt the webs are laid around a large cylinder on which is built up a number of thicknesses of material, the cylinder being of any suitable size for handling material of this sort. In practice I have found that a cylinder on which a 60 inch web can be formed around a circumference of approximately 120 inches is satisfactory.

After a suitable number of laminations are built up on this cylinder, the material is cut lengthwise of the axis of the cylinder and allowed to fall on a conveyor to be carried toward the point at which the next operation is performed. In the meantime, the web from the wet machine continues to be fed around the cylinder in preparation for the formation of another sheet of the reenforced cementitious material. In practice, I have found that building the sheet up to about one-fourth of an inch thickness is satisfactory for the purposes of this invention.

After formation of the sheets they are preferably compressed to compact the material more thoroughly, and to this end the conveyor may be arranged to take each sheet to a point where it is deposited on a steel plate, a plurality of sheets, each upon its steel plate, being piled one above the other and the stack of sheets and plates being then fed into a hydraulic press by means of which each of the sheets is pressed into a compact, unitary mass and the exces water necessary for the prior steps in the process is exuded. This pressing operation serves to press the material of each sheet into a dense compact mass and when starting with a thickness of one-fourth of an inch the material may be compressed in this way to about one-eighth of an inch.

The compressed sheets are now removed from the press and are piled one above the other for seasoning and setting, which operation requires several days.

From the large sheets of tile material the individual tiles may be cut by means of any suitable apparatus and, if desired, before cutting the sheets into individual tiles they may be treated with suitable means for giving their surfaces a higher degree of hardness, as more fully set forth in the copending application hereinabove identified, or they may be treated with means for rendering their surfaces impervious to stains and moisture, one treatment supplementing the other or being substituted for the other.

In practice I preferably treat the tiles to render them impervious to stains and moisture either after the formation of the individual tiles and their arrangement in the laying units, or after they have actually been installed in the floor or wall construction. I have found that a suitable finish for the surface of the tiles is a mixture of boiled linseed oil, beeswax and turpentine in equal parts.

One advantage of the use of this mixture is that when asbestos fibre, for example, is used for the reenforcing means, this fibre does not absorb as much as cement, and treatment with this wax, turpentine and oil mixture therefore brings out the fibre and any coloring pigments which may have been used in producing the tile.

Tiles thus formed of reenforced cement, although substantially rigid, are sufficiently flexible to compensate for slight unevenness of the surfaces upon which they may rest and for considerable variations in pressure upon different parts thereof. Moreover, they are not so brittle and fragile as ordinary ceramic tiles and thus withstand better the shocks and rough usage to which they are subjected when used in ordinary floor constructions.

These thin, comparatively light tiles may be secured in position in the floor or wall construction in various ways, but I have found that one of the most satisfactory constructions from the standpoint of durability, freedom from liability to accidental injury, absorption of sound, cushioning of shocks, simplicity and economy of installation and ease of waterproofing is either to secure or bond the tiles directly to the supporting structure by means of an adhesive, as shown in Fig. 4, which is preferably sufficiently resilient to cushion the tiles against shock and which is preferably water-repellant or waterproof and also preferably sound absorbing, or to secure the tiles to a sheet of material interposed between the tiles and the supporting structure, which sheet material preferably has some or all of the foregoing qualities.

In one embodiment of the invention illustrated in Figs. 1 to 3, the tiles 2 are preferably secured to a base unit 4 which may be, for example, a sheet of asphalt impregnated felt commonly referred to in the rug trade as felt base material, the tiles being preferably cemented to this felt base material by a suitable adhesive which will act as a bond between the material of which the tiles are made and the asphalt impregnated felt base. Examples of such adhesives are ordinary linoleum cements, casein, etc. I have also found that emulsified asphalt makes a satisfactory adhesive binder for use in this invention.

The floor or wall units thus formed may be secured in position in the floor or wall construction in any suitable manner, but I have found that in floor constructions particularly it is advantageous to secure them in position in somewhat the same manner that linoleum is secured upon floors, that is, by use of one of the mastic adhesives commonly employed as linoleum cements or the emulsified asphalt hereinabove referred to.

When the units are secured upon walls in making tiled wall constructions, if it is desired further to secure the units against displacement by reason of the settling of the walls in new building constructions, a tile may be left out on each unit when assembling the units and a nail or other fastening 6 may be driven through the asphalt saturated felt or other base material to reenforce the cement as securing means, as shown in Figs. 6 and 7, the tile omitted being then cemented in place to cover the fastening and restore the design. This additional securing means may also be used, if desired, in the floor constructions, but I have not found it essential in either floor or wall constructions.

The omission of a tile in each of the units or in several of the units and its insertion after the unit is in position on the floor or wall may also be employed for obtaining irregular design effects such as the Dutch tile designs shown in Fig. 6.

It will be apparent that the improved tiled floor or wall construction just described is not limited in its utility and in the attainment of many of its important advantages to the incorporation therein of tiles of the particular construction and composition of those hereinabove described, but that many of the important advantages of the invention may be obtained when ordinary ceramic tiles, slate tiles or tiles of any of the known tile materials, particularly tiles which are substantially rigid, are employed in this wall or floor construction. In fact this novel tiled floor or wall construction makes possible the use for tiles of materials not heretofore considered useful for such purposes.

In the construction shown in Fig. 4 of the drawings, the tiles 2, instead of being first attached to a base unit, are laid directly upon the resilient adhesive 8 by which they are bonded to the supporting structure 10 and the tiles may be laid either in abutting relation, like those shown in Fig. 3, which are attached to the base 2, or they may be laid in separated relation as shown in Fig. 4, the interstices 12 between the tiles being filled either with the same adhesive which is used to secure them to the supporting structure, or with any suitable mortar to give the desired mortar joint effect. In preparing a foundation for the tiles, a bed 8 of substantial thickness of the mastic adhesive is spread upon the supporting structure or underfloor as shown in Figs. 3 and 4 before the tiles are placed in position. A supporting bed of this character is preferably employed whether the tiles are applied to a flexible backing to form tile units or whether the individual tiles are laid directly upon the bed. The emulsified asphalt referred to above will form a bed which is permanently plastic and resilient and will therefore retain its adhesive and yielding qualities so as to maintain the tiles securely held in position and to form a permanent cushion to protect the tiles from fracture.

Figure 5:
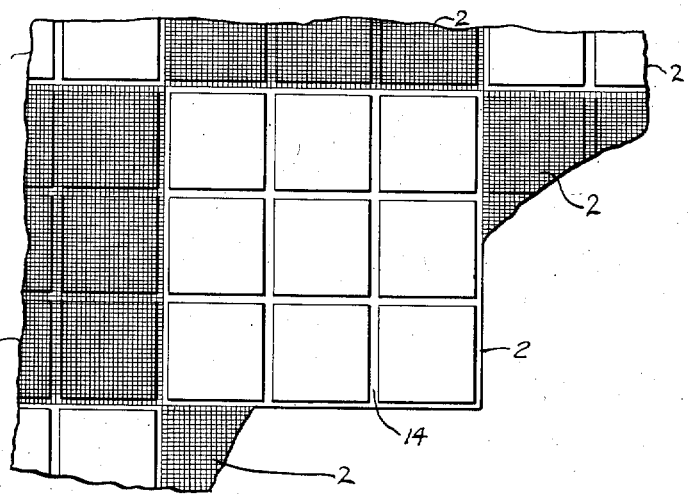
Fig. 5 shows a modified form of the invention in which the individual tiles are scored during or after formation to give each the appearance of a plurality of tiles.

In Figs. 1 to 3 inclusive, the design unit is made up of individual tiles which may have their edges bevelled or concaved as shown in Figs. 1 and 3 and at the time they are made, or this bevelling or concaving may be effected after the tiles are assembled upon the design unit, a simple way of securing this result being to pass the unit beneath an abrasive wheel to produce the desired groove 14 at the line of contact between adjacent tiles. Where it is desired to produce the appearance of smaller tiles without the necessity for actually placing these smaller tiles in position on the design unit, larger tiles may be scored or grooved, as shown in Fig. 5, to give the appearance of smaller tiles, and this scoring or grooving may be effected either before the larger tiles are assembled in position on the design unit, or after they are assembled in position.

It will be understood, of course, that design units may be made in various ways and that the material of the base of a design unit may be of any suitable composition. Although the usual practice will doubtless be to assemble the design unit directly upon a base unit of cushioning material such, for example, as asphalt saturated felt and this base unit will usually be somewhat flexible to facilitate placing in the wall or floor construction, it will be understood that flexibility and resilience are not essential to the design unit itself, particularly when made in the smaller dimensions. For example, in some cases I have found it advantageous to make up a design unit by assembling tiles of the desired colors and of the composition hereinabove specifically set forth upon a base of the same composition so that the whole design unit is of substantially homogeneous composition and substantially rigid throughout.

In Fig. 8 is shown a modification of the tile construction by which cameo effects may be obtained in the tile design. By placing a sheet 16 of the tile material hereinabove described of one color upon a sheet 18 of another color so that the resultant tile is composed of laminæ of different colors and then cutting through the upper lamina to the lower lamina, relief design and two-color effects may be obtained.

One advantage of using the novel tile of the present invention in the novel tiled floor or wall constructions is that if for any reason it is desirable to secure an individual tile more strongly in position than other tiles to meet special conditions, fastenings can be driven directly through the tile without breaking it. Thus, if desired, in replacing broken tiles or in laying tiles to meet special conditions, a nail or other suitable fastening can be driven directly through the tile to secure the tile in position or to supplement other securing means.

From the foregoing description it will be apparent that the improved tiled wall or floor construction of the present invention is economical to install both from the standpoint of the cost of the materials that enter into it and from the standpoint of the labor involved in its installation, and that for these reasons alone it has a wider field of utility than tiled floor and wall constructions heretofore known. It will also be apparent that by reason of the construction of the tile preferably employed in the improved wall and floor construction and by reason of the cushioning of this tile as a part of the construction, the improved wall or floor construction has utility in many places where tiled wall or floor constructions of the prior art would be practically useless.

It will further be apparent that by reason of the comparative lightness of the wall or floor construction of the present invention and the ease and simplicity of its installation it can be employed in existing structures to replace less durable constructions such as linoleum, felt base covering materials, wooden floors, etc., and that by reason of its waterproof and stainproof qualities in its preferred embodiment it is a particularly desirable substitute for linoleum, ceramic tile and composition floorings and walls in places where the floors or walls are exposed to wetting or to the spilling thereon of staining solutions.

It will be obvious that various changes may be made in the form, composition and arrangement of the parts without departing from the invention, the scope of which is defined in the claims.

What is claimed as new is:

1. A floor comprising tile units each made up of juxtaposed relatively rigid tile sections of water-setting cement composition, bonded to a continuous backing sheet of flexible fibrous material, and a body of substantial thickness of permanently plastic flexible yielding material to which said units are bonded, each unit as a whole being capable of substantial flexure under the tread of pedestrians by reason of the independent bonding of the individual tile sections to the backing sheet.

2. A floor comprising tile units each made up of juxtaposed relatively rigid tile sections of water-setting cement composition bonded to a continuous backing sheet of flexible fabric containing a substantial proportion of fibrous material, and a bed of substantial thickness of permanently plastic flexible yielding material to which said units are bonded by the adhesion of said material to the fabric backing sheet, each unit as a whole being capable of substantial flexure under the tread of pedestrians by reason of the independent bonding of the individual tile sections to the backing.

3. A floor comprising tile units each made up of relatively rigid tile sections of water-setting cement composition, a continuous backing sheet of yielding flexible asphalt-impregnated roofing felt to which said tile sections are bonded in edge-to-edge relation, each unit as a whole being capable of substantial flexure under the tread of pedestrians by reason of the independent bonding of the individual tile sections to the backing, the units being adapted to be laid upon and bonded to a bed of substantial thickness of permanently plastic flexible yielding material.

4. A floor comprising relatively rigid tile sections of water-setting cement composition bonded to a backing sheet of flexible fabric containing a substantial proportion of fibrous material, and a body of substantial thickness of permanently plastic flexible yielding material to which said backing is bonded, the floor being capable of substantial flexure under the tread of pedestrians by reason of the independent bonding of the individual tile sections to the backing.

5. A floor comprising relative thin rigid tile sections of water-setting cement composition, a backing sheet of flexible fibrous material to which the tile sections are bonded, said backing sheet forming a cushion for the tiles, and a yielding bed consisting of a body of substantial thickness of a resilient mastic bonded to said backing sheet and securing the tile sections and backing to the underfloor, the floor being capable of substantial flexure by reason of the independent bonding of the individual tiles to the backing.

6. A floor comprising tile units each made up of relatively thin unyielding tile sections of water-setting cement composition laid in juxtoposed edge-to-edge relation, a continuous backing sheet of flexible waterproof fabric bonded to said tile sections by a waterproof bond, and a body of substantial thickness of permanently plastic flexible yielding material to which said units are bonded, each unit as a whole being capable of substantial flexure under the tread of pedestrians by reason of the independent bonding of the individual tile sections to the backing.

7. A floor comprising tile units each made up of relatively thin unyielding tile sections of water-setting cement composition laid in juxtaposed edge-to-edge relation, a continuous backing sheet of flexible fabric to which said tiles are bonded, and a bed of substantial thickness of permanently plastic yielding waterproof material to which said units are bonded, each unit as a whole being capable of substantial flexure under the tread of pedestrians by reason of the independent bonding of the individual tile sections to the backing.

8. A floor comprising tile units each made up of relatively rigid tile sections of cement asbestos composition laid in juxtaposed relation, a continuous backing sheet of flexible felt impregnated with waterproof material to which said tile sections are bonded, and a body of substantial thickness of permanently plastic flexible yielding material to which said units are bonded, each unit as a whole being capable of substantial flexure under the tread of pedestrians by reason of the independent bonding of the individual tile sections to the backing.

9. A floor comprising tile units each made up of relatively unyielding tile sections of water-setting cement composition laid in juxtaposed relation, a continuous flexible backing sheet of asphalt-impregnated felt to which said tile sections are bonded, and a body of substantial thickness of permanently plastic flexible yielding material to which said units are bonded, each unit as a whole being capable of substantial flexure under the tread of pedestrians by reason of the independent bonding of the individual tile sections to the backing.

10. A floor comprising tile units each made up of juxtaposed relatively thin rigid tile sections of cement asbestos composition, a flexible backing of asphalt-impregnated felt, bonding means of asphalt composition for securing the tiles to the backing, a bed of substantial thickness of permanently plastic yielding asphalt composition, bonding means of asphalt composition for securing said units to said bed, each unit as a whole being capable of substantial flexure under the tread of pedestrians by reason of the independent bonding of the individual tile sections to the backing.

11. A sectionalized floor covering, a section of which comprises a flexible waterproof fabric backing piece, and a plurality of relatively rigid tile units covering the backing piece and secured thereto only on their rear surfaces, the interstices between adjacent tile units being open and free so that the section is flexible as a whole and the backing piece serving as a permanent support for the tiles whereby they are attached to an underlying floor.

12. A sectionalized floor and wall covering, a section of which comprises a flexible waterproof fabric backing piece adapted to lie against and be permanently attached to an underlying support, and a plurality of relatively rigid tile units permanently adhered to the backing piece, the interstices between adjacent units being open and free to permit articulation therebetween by the bending of the backing piece whereby a section may accommodate itself to unevenness of the underlying support.

13. A sectionalized floor and wall covering, each section of which comprises a flexible waterproof fabric backing piece which forms a permanent means whereby the section may be attached to an underlying floor or wall, and a plurality of relatively rigid tile units permanently adhered on their back surfaces only to the backing piece leaving the interstices between adjacent units free and open to permit articulation therebetween by bending of the flexible backing piece so that a section may accommodate itself to unevenness of underlying wall or floor.

14. A floor or wall construction comprising a relatively thin unyielding tile section, a body of substantial thickness of a plastic yielding but resilient material, and a sheet of flexible fabric, said parts of the construction being bonded together in such relation that said tile section is yieldingly supported by said body of plastic resilient material but is held in position with respect to the backing sheet independently of other parts of the construction whereby said construction without damage thereto is capable of distortion under substantial force applied thereto.

15. A floor or wall construction comprising a relatively thin unyielding tile section, a body of substantial thickness of a plastic yielding but resilient material, and a sheet of flexible fabric, said parts of the construction being bonded together in such relation that said tile section is yieldingly supported by said body of plastic resilient material but is held in position thereon and in relation to the backing sheet independently of adjacent tiles whereby said construction without damage thereto is capable of distortion under substantial force applied thereto.

STEWART W. CHAFFEE.